Patented Feb. 19, 1946

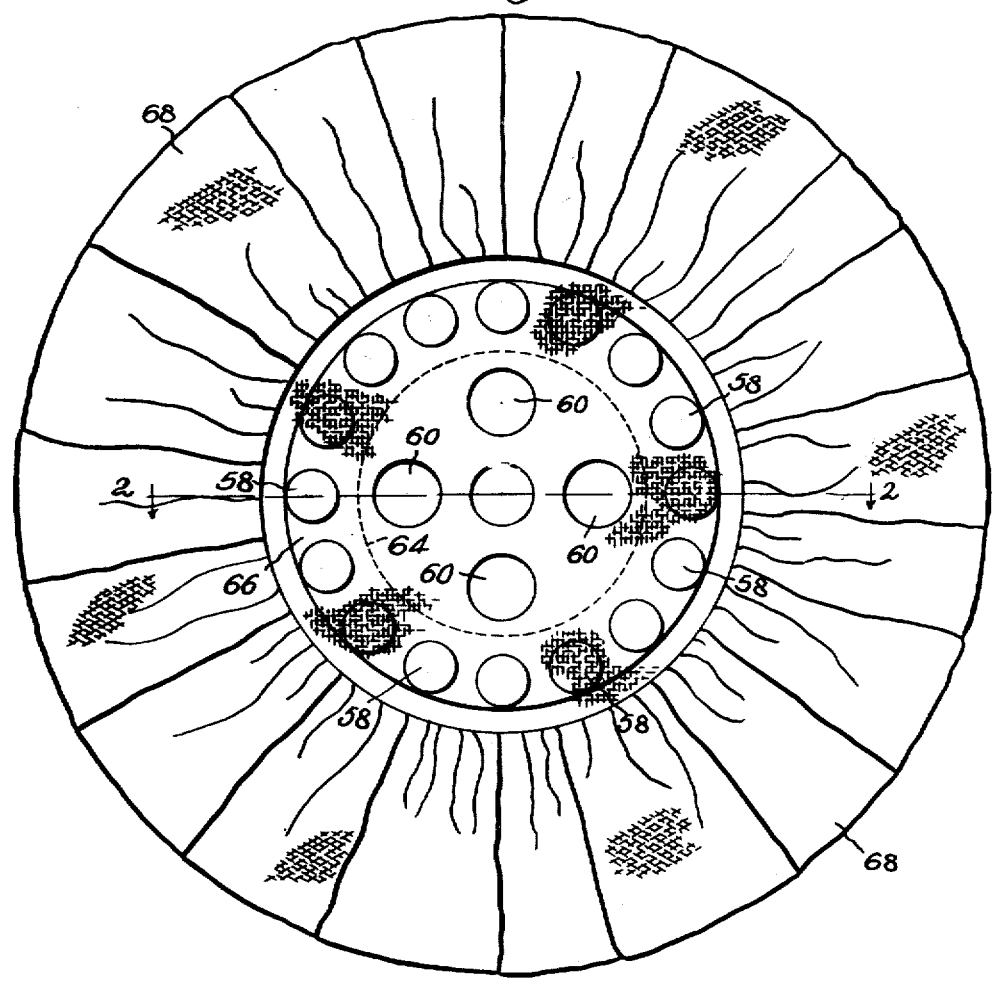
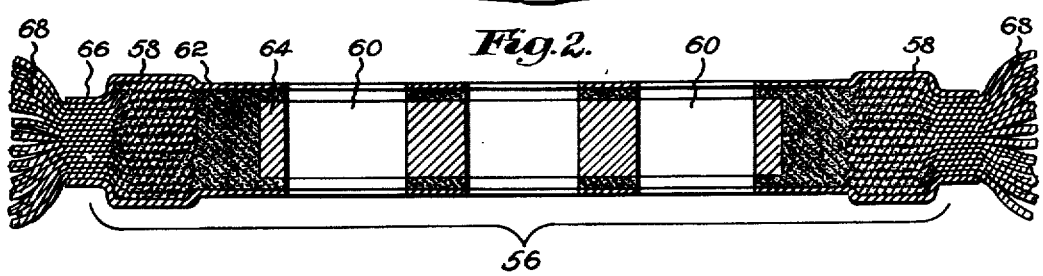

2,395,325

UNITED STATES PATENT OFFICE 2,395,325

ABRADING WHEEL

Elisha W. Hall, Scituate, Mass.

Application September 4, 1943, Serial No. 501,237

10 Claims. (Cl. 51—193)

This invention relates to abrading tools, and is concerned with rotary brushes, as well as buffing and polishing tools. The abrading wheel or wheel section comprises an annular body of abrading material which may be radially disposed bristles (animal, vegetable or synthetic fiber) or layers of cloth and a reinforced, molded adhesive plastic hub, the inner, annular margin of the abrading material being incorporated in and adhesively united with the hub. The wheel sections are intended to be assembled between clamping plates on an arbor in the customary manner.

The invention will be best understood by reference to the following description of certain abrading tools and method of making the same, illustrated by the accompanying drawing, while its scope will be pointed out more particularly in the appended claims.

In the drawing:

Fig. 1 is an elevation of an abrading tool in which the annular body of abrading material is helically wound, ruffled cloth with its inner, annular margin incorporated in the molded hub; and Fig. 2 is a sectional view on an enlarged scale on the line 2—2 of Fig. 1.

Referring to the drawing, there is shown a wheel section comprising a hub 56 provided with shallow, closely spaced projections 58 on one or both faces, which abut against like projections or against a flat face of the hub of an adjacent wheel section and space the faces of the hubs to provide for the escape of air admitted from perforated end plates through apertures 60 in the hubs.

In this example the hub comprises a body 62 of plastic adhesive material, herein a composition of sawdust (maple or other hardwood sawdust is preferable), and a synthetic resin such as an aldehyde (or formaldehyde) urea molding composition which is soluble in water, is highly adhesive, and when hardened is waterproof. Its nature is such that it penetrates between and surrounds individual fibers of the abrading material, thus securely anchoring the same. To strengthen the hub, there are added internal and external reinforcements such as a wooden disk 64 embedded in the molded material and cloth disks 66 on the outside of and adhesively united with the plastic material which in fact penetrates the pores or interstices of the cloth reinforcements as well as the inner margin of the abrading material 68 which, in this case, consists of plies of cloth without sewing, and united solely by the plastic adhesive.

The wooden reinforcing disk prevents warping of the hub and reduces the amount of plastic needed, thus reducing the cost. The outer reinforcements of cloth still further strengthen and reinforce the plastic material. The described assembly of wooden reinforcing disks 64, cloth reinforcing disks 66, and abrading material 68, together with a predetermined quantity of the described mixture, is introduced into a suitable separable mold, with the inner margin of the abrading material within the mold and the remainder of the abrading material outside the mold. Pressure is applied to the mold to cause the mixture to fill the mold completely and to flow about those portions of the abrading material which extend into the mold, and hence firmly uniting each fiber with the hub. Heat is then applied, as by infra-red rays to the wheel section while the hub is in the mold. It has been found that one and one-half hours of this treatment is sufficient. The wheel section is then removed from the mold and is allowed to age for a time to acquire maximum strength.

Having thus described the invention, what I claim and desire by Letters Patent to secure is:

1. A rotary abrading tool comprising an annular body of abrading material, and a molded adhesive plastic hub adhesively united with said abrading material, said hub having embedded therein a reinforcing disk of wood.

2. A rotary abrading tool comprising an annular assembly of abrading material, and a hub comprising a wooden disk and a molded adhesive plastic about the same, the inner margin of said abrading material being incorporated in and adhesively united with said plastic about the circumference of said disk.

3. The method of making a rotary brush which comprises arranging bristles as an annular body by predetermining the locations of one set of ends and predetermining the radial emplacement of the bristles, and then molding about and embracing the inner annular margin of said body a hub of adhesive plastic material.

4. The method of making a rotary brush which comprises arranging bristles as an annular body upon an annular support by predetermining the locations of one set of ends and predetermining the radial emplacement of the bristles, placing an annular weight upon an annular portion of said bristles exclusive of their inner ends to hold them in place on said support, and molding about and embracing the inner ends of said bristles a hub of adhesive plastic material.

5. The method of making a rotary brush which comprises employing means to predetermine the arrangement of bristles as an annular body, removing the arrangement-predetermining means, and molding about and embracing the inner ends of said bristles or hub of adhesive plastic material.

6. An abrading tool comprising a body containing a composition of wood sawdust and an aldehyde urea resin glue, and an annular body of abrading material partially incorporated in and adhesively united with said composition.

7. A rotary abrading tool comprising, in combination, a hub, and an annular body of abrading material about and having its inner margin united with said hub, said hub comprising a web provided with an axial opening to receive a shaft to rotate the tool, said web being provided also with at least one other opening for the passage of air through said web lengthwise of the axis of rotation, and said hub being provided with at least one passage whose inner end communicates with and is supplied with air from the second-named opening, and whose outer end discharges such air by centrifugal force outwardly toward said abrading material to cool the latter, said passage being disposed non-radially and at an angle to a radius from the axis to promote maximum flow of air from the second-named opening through said passage to said abrading material to produce maximum cooling effect.

8. A rotary abrading tool comprising, in combination, a hub, and an annular body of abrading material about and having its inner margin united with said hub, said hub comprising a web provided with an axial opening to receive a shaft to rotate the tool, said web being provided also with at least one other opening for the passage of air through said web lengthwise of the axis of rotation, and said hub being provided with at least one passage whose inner end communicates with and is supplied with air from the second-named opening, and whose outer end discharges such air by centrifugal force outwardly toward said abrading material to cool the latter, said passage being disposed tangentially in respect to said web to promote maximum flow of air from the second-named opening through said passage to produce maximum cooling effect.

9. A rotary abrading tool comprising, in combination, a hub, and an annular body of abrading material about and having its inner margin united with said hub, said hub comprising a web provided with an axial opening to receive a shaft to rotate the tool, said web being provided also with at least one other opening for the passage of air through said web lengthwise of the axis of rotation, and said hub being provided with at least one passage whose inner end communicates with and is supplied with air from the second-named opening, and whose outer end discharges such air by centrifugal force outwardly toward said abrading material to cool the latter, said passage being disposed tangentially in respect to said web to promote maximum flow of air from the second-named opening through said passage to produce maximum cooling effect, said passage being outwardly widened to prevent clogging by foreign matter passing therethrough.

10. A rotary abrading tool comprising, in combination, an annular assembly of bristles each of which is generally radial and straight and unlooped from end to end throughout its entire length, and a molded adhesive plastic hub in which the inner ends of said bristles are anchored solely by reason of the fact that each individual bristle is surrounded by said adhesive plastic, the entire remainder of each bristle projecting unsupported from the periphery of said hub and free to bend in any direction when in contact with the work.

ELISHA W. HALL.

Certificate of Correction

Patent No. 2,395,325.    February 19, 1946.

ELISHA W. HALL

It is hereby certified that errors appear in the printed specification of the above numbered patent requiring correction as follows: Page 1, second column, line 37, beginning with "3. The method of" strike out all to and including the word and period "material.", page 2, first column, lines 4–5, comprising claims 3, 4 and 5; page 2, first column, line 11, beginning with "7. A rotary" strike out all to and including "with the work.", same page, second column, line 39, comprising claims 7 to 10 inclusive; and for the claim now appearing in the patent as claim "6" read *3*; in the heading to the printed specification, line 5, for "10 Claims" read *3 Claims*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.* arrangement of bristles as an annular body, removing the arrangement-predetermining means, and molding about and embracing the inner ends of said bristles or hub of adhesive plastic material.

6. An abrading tool comprising a body containing a composition of wood sawdust and an aldehyde urea resin glue, and an annular body of abrading material partially incorporated in and adhesively united with said composition.

7. A rotary abrading tool comprising, in combination, a hub, and an annular body of abrading material about and having its inner margin united with said hub, said hub comprising a web provided with an axial opening to receive a shaft to rotate the tool, said web being provided also with at least one other opening for the passage of air through said web lengthwise of the axis of rotation, and said hub being provided with at least one passage whose inner end communicates with and is supplied with air from the second-named opening, and whose outer end discharges such air by centrifugal force outwardly toward said abrading material to cool the latter, said passage being disposed non-radially and at an angle to a radius from the axis to promote maximum flow of air from the second-named opening through said passage to said abrading material to produce maximum cooling effect.

8. A rotary abrading tool comprising, in combination, a hub, and an annular body of abrading material about and having its inner margin united with said hub, said hub comprising a web provided with an axial opening to receive a shaft to rotate the tool, said web being provided also with at least one other opening for the passage of air through said web lengthwise of the axis of rotation, and said hub being provided with at least one passage whose inner end communicates with and is supplied with air from the second-named opening, and whose outer end discharges such air by centrifugal force outwardly toward said abrading material to cool the latter, said passage being disposed tangentially in respect to said web to promote maximum flow of air from the second-named opening through said passage to produce maximum cooling effect.

9. A rotary abrading tool comprising, in combination, a hub, and an annular body of abrading material about and having its inner margin united with said hub, said hub comprising a web provided with an axial opening to receive a shaft to rotate the tool, said web being provided also with at least one other opening for the passage of air through said web lengthwise of the axis of rotation, and said hub being provided with at least one passage whose inner end communicates with and is supplied with air from the second-named opening, and whose outer end discharges such air by centrifugal force outwardly toward said abrading material to cool the latter, said passage being disposed tangentially in respect to said web to promote maximum flow of air from the second-named opening through said passage to produce maximum cooling effect, said passage being outwardly widened to prevent clogging by foreign matter passing therethrough.

10. A rotary abrading tool comprising, in combination, an annular assembly of bristles each of which is generally radial and straight and unlooped from end to end throughout its entire length, and a molded adhesive plastic hub in which the inner ends of said bristles are anchored solely by reason of the fact that each individual bristle is surrounded by said adhesive plastic, the entire remainder of each bristle projecting unsupported from the periphery of said hub and free to bend in any direction when in contact with the work.

ELISHA W. HALL.

Certificate of Correction

Patent No. 2,395,325.  February 19, 1946.

ELISHA W. HALL

It is hereby certified that errors appear in the printed specification of the above numbered patent requiring correction as follows: Page 1, second column, line 37, beginning with "3. The method of" strike out all to and including the word and period "material.", page 2, first column, lines 4–5, comprising claims 3, 4 and 5; page 2, first column, line 11, beginning with "7. A rotary" strike out all to and including "with the work.", same page, second column, line 39, comprising claims 7 to 10 inclusive; and for the claim now appearing in the patent as claim "6" read *3*; in the heading to the printed specification, line 5, for "10 Claims" read *3 Claims*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.*